(12) United States Patent
Casci et al.

(10) Patent No.: US 12,381,027 B2
(45) Date of Patent: Aug. 5, 2025

(54) POWER INDUCTOR WITH INTERNAL COOLING PASSAGES

(71) Applicant: FORD GLOBAL TECHNOLOGIES, LLC, Dearborn, MI (US)

(72) Inventors: John P. Casci, Westland, MI (US); Moon Young Lee, Livonia, MI (US); Baoming Ge, Okemos, MI (US); Fan Wang, Novi, MI (US)

(73) Assignee: Ford Global Technologies, LLC., Dearborn, MI (US)

( * ) Notice: Subject to any disclaimer, the term of this patent is extended or adjusted under 35 U.S.C. 154(b) by 903 days.

(21) Appl. No.: 17/513,330

(22) Filed: Oct. 28, 2021

(65) Prior Publication Data

US 2023/0137863 A1    May 4, 2023

(51) Int. Cl.
    *H01F 27/28*    (2006.01)
    *H01F 27/12*    (2006.01)
    *H01F 27/24*    (2006.01)
    *H02M 3/158*    (2006.01)

(52) U.S. Cl.
    CPC ............ *H01F 27/12* (2013.01); *H01F 27/24* (2013.01); *H01F 27/28* (2013.01); *H02M 3/158* (2013.01)

(58) Field of Classification Search
    CPC .......... H01F 27/12; H01F 27/24; H01F 27/28; H01F 27/025; H01F 37/00; H01F 27/10; H01F 27/306; H01F 3/14; H02M 3/158; H02M 1/327; H02M 3/003

USPC ....................................... 336/60–65, 83, 221
See application file for complete search history.

(56) References Cited

U.S. PATENT DOCUMENTS

| | | | |
|---|---|---|---|
| 3,183,461 A * | 5/1965 | Tipton | H01F 27/08 336/212 |
| 8,922,311 B2 | 12/2014 | Pal et al. | |
| 10,529,479 B2 | 1/2020 | Skalski et al. | |
| 10,699,840 B2 | 6/2020 | Sung et al. | |
| 2006/0044103 A1* | 3/2006 | Roebke | H01F 27/10 336/208 |
| 2012/0139683 A1* | 6/2012 | Salomaki | H01F 27/263 165/177 |
| 2012/0268227 A1* | 10/2012 | Howes | F28D 15/0266 336/57 |
| 2014/0132380 A1* | 5/2014 | Jacobson | H01F 27/24 29/605 |
| 2015/0116064 A1 | 4/2015 | Kumar et al. | |
| 2015/0310976 A1* | 10/2015 | Tong | H01F 27/18 336/60 |
| 2017/0084375 A1 | 3/2017 | Vafakhah et al. | |
| 2021/0159006 A1* | 5/2021 | Curuvija | H01F 41/02 |
| 2022/0037072 A1* | 2/2022 | Nishimura | H01F 27/025 |

\* cited by examiner

*Primary Examiner* — Shawki S Ismail
*Assistant Examiner* — Kazi S Hossain
(74) *Attorney, Agent, or Firm* — David B Kelley; Brooks Kushman P.C.

(57) ABSTRACT

A power inductor includes a magnetic core having first and second legs and opposing first and second curved sections, a conductor having a first coil around the first leg and a second coil around the second leg; and a fluid circuit having a first branch disposed between the first leg and the first coil and a second branch disposed between the second leg and the second coil.

4 Claims, 4 Drawing Sheets

POWER INDUCTOR WITH INTERNAL COOLING PASSAGES

TECHNICAL FIELD

This disclosure relates to power inductors and more specifically to power inductors having internal cooling passages.

BACKGROUND

Electric vehicles may include a voltage converter (e.g., a DC-DC converter) connected between the battery and the electric machine. Electric vehicles that have alternating current (AC) electric machines also include an inverter connected between the DC-DC converter and each electric machine. A voltage converter increases ("boosts") or decreases ("bucks") the voltage potential to facilitate torque capability optimization. The DC-DC converter includes an inductor (or reactor), switches and diodes. A typical inductor includes a conductive coil that is wound around a magnetic core.

SUMMARY

According to one embodiment, a power inductor includes a magnetic core having first and second legs and opposing first and second curved sections, a conductor having a first coil around the first leg and a second coil around the second leg; and a fluid circuit having a first branch disposed between the first leg and the first coil and a second branch disposed between the second leg and the second coil.

According to another embodiment, a power inductor includes a magnetic core defining at least one recessed channel and first and second end caps disposed on opposing ends of the core. The first end cap defines an inlet port and the second end cap defines an outlet port. A coil is wrapped around the core and cooperates with the recessed channel to define a cooling passage in fluid communication with the inlet and outlet ports.

According to yet another embodiment, a power inductor includes a magnetic core having a first leg having a first side defining a first recessed channel extending along a length of the leg, a second side defining a second recessed channel extending along the length, and a third side defining a third recessed channel along a width of the first leg and interconnecting the first and second channels. The core further has a second leg that is parallel to and spaced apart from the first leg, the second leg having a first side defining a first recessed channel extending along a length of the second leg, a second side defining a second recessed channel extending along the length of the second leg, and a third side defining a third recessed channel along a width of the second leg and interconnecting the first and second channels of the second leg. A conductor has a first coil wrapped around the first leg and cooperating with the channels of the first leg to define cooling passages and has a second coil wrapped around the second leg and cooperating with the channels of the second leg to define additional cooling passages.

DETAILED DESCRIPTION

Figure 1:
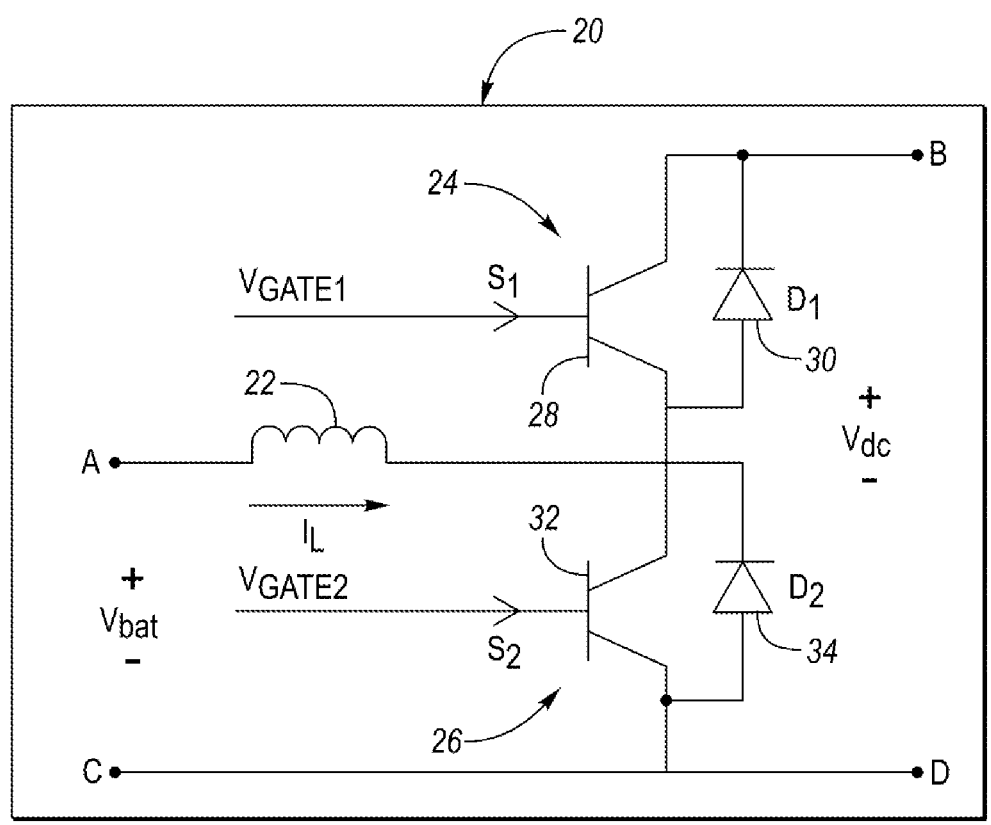
FIG. 1 is a circuit diagram of a variable-voltage converter including a power inductor.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicles may include an electric powertrain that includes at least one traction motor for powering driven wheels. The traction motor may be powered by a traction battery. The battery is a high-voltage battery capable of outputting electrical power to operate the motor. The battery also receives electrical power from the motor when operating as a generator. A high-voltage bus electrically connects the battery to the motor. The vehicle may include one or more controllers for operating various components. The vehicle controllers generally include any number of microprocessors, ASICs, ICs, memory (e.g., FLASH, ROM, RAM, EPROM and/or EEPROM) and software code to co-act with one another to perform a series of operations. The controllers also include predetermined data, or "look-up tables" that are based on calculations and test data and stored within the memory. The controllers communicate with other vehicle systems and each other over one or more wired or wireless vehicle connections using common bus protocols (e.g., CAN and LIN).

The vehicle may include a DC-DC converter or variable voltage converter (VVC) and an inverter. The VVC and the inverter are electrically connected between the battery and the motor. The VVC may "boost" or increases the voltage potential of the electrical power provided by the battery and may "buck" or decreases the voltage potential of the electrical power provided to the battery. The inverter inverts the direct current (DC) power supplied by the battery (through the VVC) to AC power for operating the motor. The inverter also rectifies AC to DC.

The VVC is an assembly with components that may be mounted both inside and/or outside of a transmission or motor assembly of a vehicle. The VVC includes a power inductor. In one or more embodiments, the inductor is located within the transmission and/or motor housing. By mounting the inductor within a wet housing, e.g., transmission housing, the exposed surface area of the inductor may be directly cooled by transmission fluid which allows for improved thermal performance. The transmission includes additional structure for supporting the inductor while allowing the transmission fluid to flow through the structure to contact the exposed surface area.

The transmission may include a fluid, such as oil or automatic transmission fluid (ATF), for lubricating and cooling the gears located within the transmission chamber as well as any electric motors. The transmission housing is sealed to retain the fluid. The transmission may also include valves, pumps and conduits (not shown) for circulating the fluid through the housing. A heat exchanger or ATF cooler may be used to cool the fluid. The fluid may also be used to cool the inductor assembly 14. The transmission housing may include a sump that collects the fluid in the circulation system that is configured to draw fluid from the sump and redistribute that fluid onto components such as the inductor. As of explain below, the transmission may be configured to directly deliver transmission fluid onto the exposed coils in core of the inductor via one or more conduits. Splash cooling may also occur. Rotating elements (e.g., gears and shafts) may displace or "splash" fluid on other components.

Referring to FIG. 1, a VVC 20 includes a power inductor 22. The VVC 20 also includes a number of switches and diodes. For example, the VVC 20 includes a first switching unit 24 and a second switching unit 26 for boosting the input voltage ($V_{bat}$) to provide output voltage ($V_{dc}$). The first switching unit 24 includes a first transistor 28 connected in parallel to a first diode 30, but with their polarities switched (anti-parallel). The second switching unit 26 includes a second transistor 32 connected anti-parallel to a second diode 34. Each transistor 28, 32 may be any type of controllable switch (e.g., an insulated gate bipolar transistor (IGBT) or field-effect transistor (FET)). Additionally, each transistor 28, 32 is individually controlled by a controller. The inductor 22 is depicted as an input inductor connected in series between the battery and the switching units 24, 26. The inductor 22 generates magnetic flux when current is supplied. When the current flowing through the inductor 22 changes, a time-varying magnetic field is created, and voltage is induced. The VVC 20 may also include different circuit configurations (e.g., more than two switches).

The following Figures and related text describe example power inductors according to one or more aspects of this disclosure.

Figure 2:
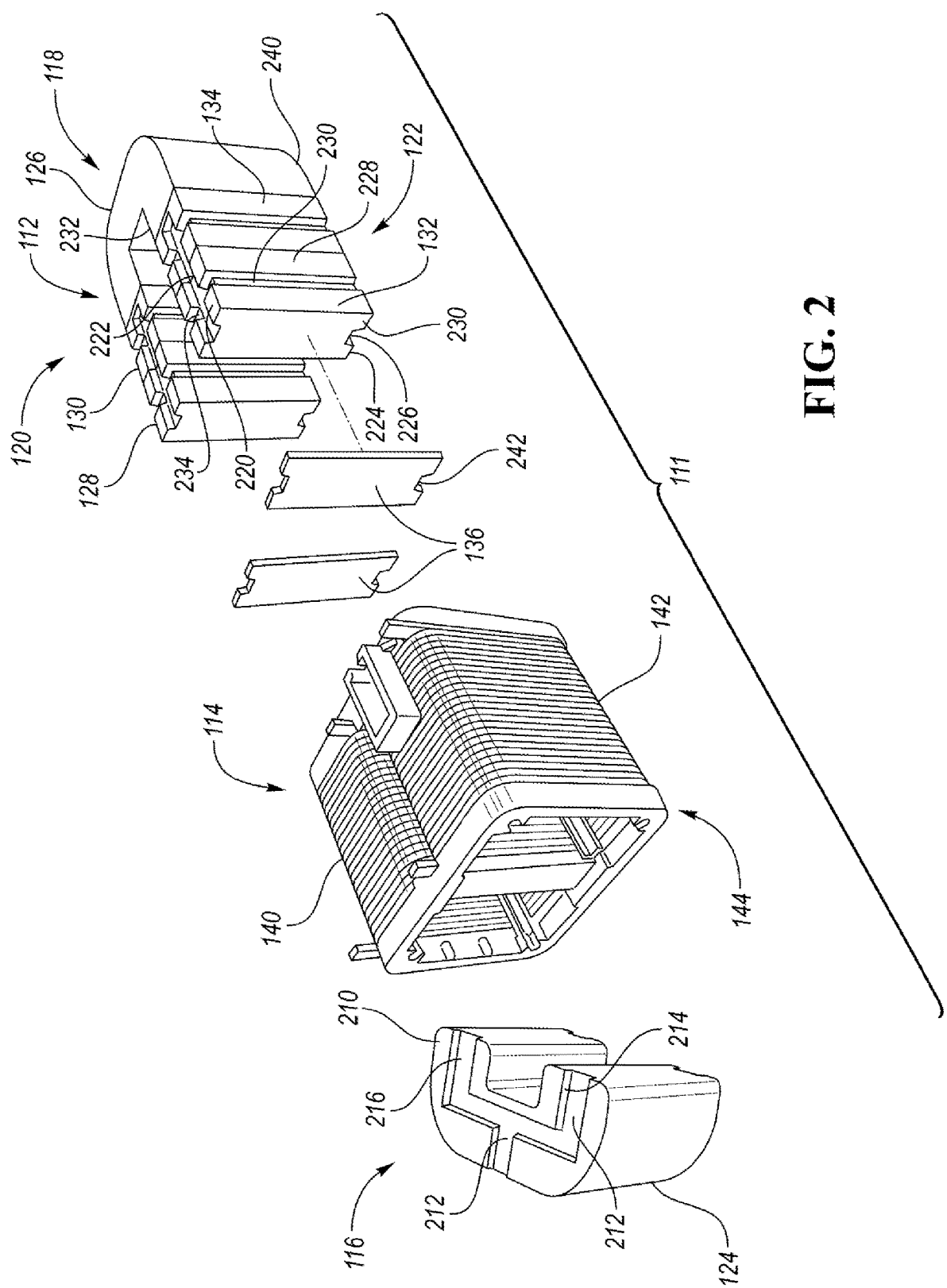
FIG. 2 is an exploded perspective view of a subassembly of the power inductor.
Figure 3:
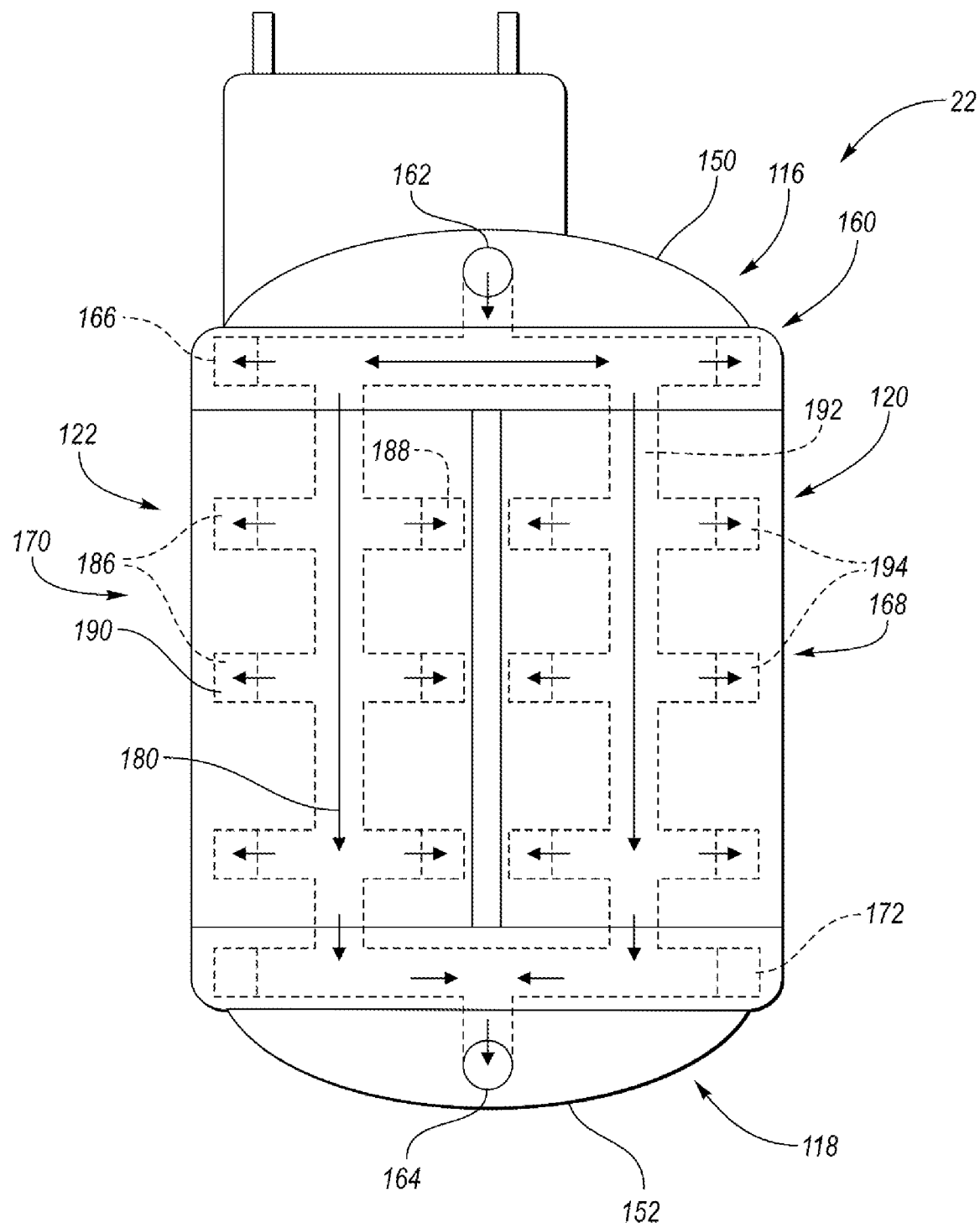
FIG. 3 is a diagrammatical front view of the power inductor illustrating an internal cooling circuit.

Referring to FIGS. 2 and 3, the power inductor 22 includes a core-and-conductor assembly 111 that may be formed as a dual "C" configuration with two coils. The assembly 111 includes a core 112 having an upper end 116 and a lower end 118 that are each formed in a curved shape. The core 112 also includes a first leg 120 and a second leg 122 for interconnecting the ends 116, 118 to collectively form a ring-shaped core 112. The core 112 may be formed of a magnetic material, such as an iron-silicon alloy powder.

Rather than being solid, the core 112 is formed of a plurality of segments that are spaced apart, by spacers, to define a plurality of gaps between adjacent ones of the segments. For example, a C-shaped segment 124 forms the curved end 116 and a C-shaped segment 126 forms the curved end 118. The first leg 120 includes two segments 128 and 130, and the second leg 122 includes two segments 132 and 134. Spacers 136 are provided between the segments. This, of course, is just one example and more or less segments may be used in other embodiments.

A conductor 114 is wrapped on the core 112. For example, the conductor includes two adjacent coils, such as copper or aluminum, that are wound into two adjacent helical coils, a first coil 140 associated with the leg 120 and a second coil 142 associated with the leg 122. The coils may be formed using a rectangular (or flat) type conductive wire by an edgewise process. Input and output leads extend to connect to other components and a jumper (not shown) is used to connect the two coils 140, 142.

A bobbin 144 is provided in some embodiments; in other embodiments, the coils are wound directly onto the core. In the shown embodiment, the bobbin 144 supports the conductor 114. The bobbin 144 may include a frame that defines openings for receiving the core 112 therein.

The power inductor 22 also includes a housing that supports the core 112 and the conductor 114. The housing may be formed of a pair of molded end caps 150 and 152. The end caps may be injection molded to the assembly 111. Portions of the housing (not visible) may interconnect the opposing end caps 150, 152 as is known in the art. The end caps 150, 152 may include mounts for attaching the power inductor to a structure. For example, the power inductor 22 may be mounted within a transmission housing.

The power inductor 22 may be cooled by a fluid. The fluid may be any dielectric fluid. For example, the fluid may be oil such as transmission fluid (ATF). The oil is supplied to the inductor 22 by a circulation system that includes one or more conduit. The circulation system may be plumbed with the valve body of the transmission in one or more embodiments. The circulation system may be open loop in which the oil drains to the sump or closed loop in which the oil exiting the power inductor is piped back to the hydraulic circuit of the transmission.

Rather than merely dripping or splashing oil onto the outer surface of the power inductor, the power inductor 22 includes an internal fluid circuit configured to circulate oil to more efficiently cool the power inductor. The internal fluid circuit is in direct contact with the core 112 and coils with portions of the circuit disposed between the core and the coils.

Figure 4:
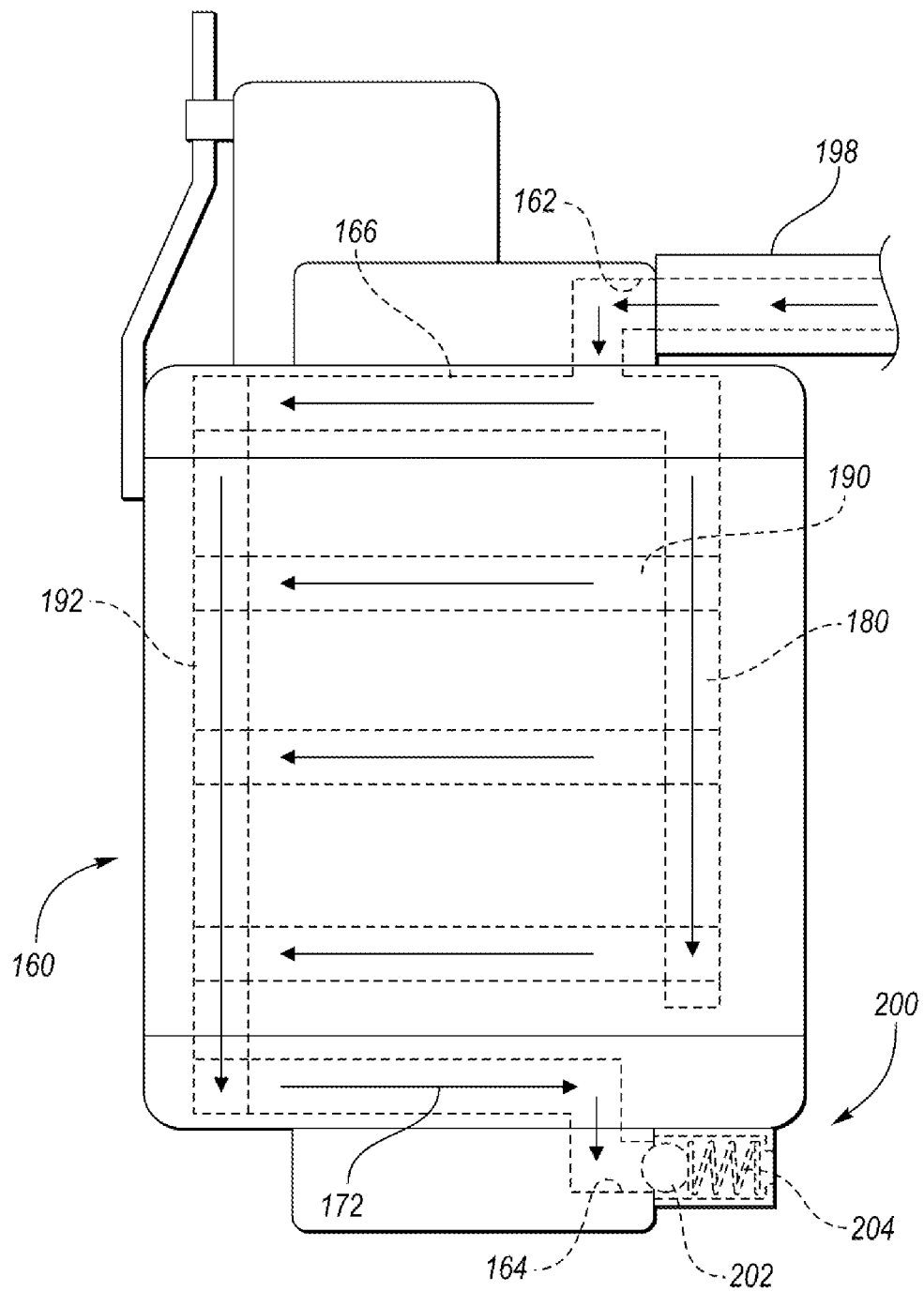
FIG. 4 is a diagrammatical side view of the power inductor illustrating the internal cooling circuit.

Referring to FIGS. 3 and 4, the power inductor 22 includes a cooling circuit 160 that is configured to circulate fluid from an inlet 162, internally through the power inductor 22, and out an outlet 164. The upper end cap 150 may define the inlet 162. An inlet manifold 166 is disposed under the end cap 150 (at least partially). The inlet manifold 166 may be defined mainly by the cooperation of the core 112 and the end cap 150. The inlet manifold 166 feeds a first branch 168 associated with the first leg 120 and a second branch 170 associated with the second leg 122. The first branch 168 includes a plurality of interconnected passages defined between the first leg 120 and the coil 140, and the second branch 170 includes a plurality of interconnected passages defined between the second leg 122 and the coil 142. The branches 168, 170 terminate at the outlet manifold 172 provided under the lower end cap 152. The outlet manifold 172 may be defined mainly by the cooperation of the core 112 and the end cap 152. The outlet manifold 172 is in fluid communication with the outlet port 164.

The second branch 170 has a plurality of passages including a supply passage 180 that extends axially along the length second leg 122 (vertical in the illustrated orientation). The supply passage 180 extends downwardly from the inlet manifold 166. The supply passage 180 feeds oil to a plurality of horizontal passages 186 (also referred to as interconnecting passages). The horizontal passages 186 include a set of inner passages 188 located on the inner side of the second leg and a set of outer passages 190 located on the outer side of the second leg 122. The horizontal passages 186 extend along the width of the second leg 122. The horizontal passages 186 connect the supply passage 180 in fluid communication with a return passage 192. The return passage 192 also extends axially along the length of the second leg similar to the supply passage, albeit on an opposite side of the leg 122. The return passage 192 is in fluid communication with the outlet manifold 172. The outlet manifold 172 may circulate the oil to the outlet port 164, which may drain to the sump of the transmission or other housing.

The first branch 168 may be the same or similar to the second branch 170 and will not be described in detail for brevity. In short, the first branch 168 includes a vertical supply passage 192, a plurality of horizontal passages 194, and a return passage (not visible). The first and second branches 168, 170 may connected in parallel between the inlet manifold 166 and the outlet manifold 172. During operation, fluid circulates through these branches to remove heat from the power inductor. By providing the internal cooling circuit 160, the cooling oil is in direct contact with both the core 112 and the conductor 114 to provide efficient and effective thermal management of the power inductor 22 even under heavy duty cycles.

The inlet port 162 is configured to connect with a tube 198 or other conduit configured to supply fluid to the power inductor 22. The outlet port 164 may simply be an orifice that drains oil to the sump. Alternatively, the outlet port 164 may connect with a conduit (not shown).

The cooling circuit 160 may perform better if back pressure is present within the circuit. As shown in FIG. 4, a check valve 200 may be used to maintain a predetermined amount of back pressure. The check valve 200 is biased to the closed position and opens responsive to the pressure within the circuit 160 exceeding a threshold. The check valve 200 may include a ball 202 that is urged against a valve seat by a resilient member such as a spring 204. The check valve 200 may be a connected to the outlet port 164. Alternatively, the check valve may be provided internally between the outlet manifold 172 and the outlet port 164. In a further alternative, the check valve may be provided downstream of the power inductor such as on a tube connecting to the outlet port 164. A tube may be connected to the outlet of the check valve in some embodiments.

Other ways of providing back pressure are also contemplated. For example, the outlet port may be throttled to increase back pressure within the cooling circuit. Alternatively, rather than flowing the fluid from top to bottom, the inlet port may be provided on the bottom of the power inductor and the cooling circuit may circulate from bottom to top. Here, gravity provides sufficient back pressure. In yet another embodiment, the inlet and outlet ports may connect with a closed loop system of a transmission hydraulic circuit. The pressure within the hydraulic circuit may create sufficient back pressure at the outlet port to maintain the desired back pressure within the cooling circuit.

Referring back to FIG. 2, the cooling network 160 may be generally formed by recessed channels defined in the core 112. The recessed channels of the core 112 are open channels that become sealed by the coils (or the end caps or bobbins) thus forming closed fluid conduits, i.e., the above-described passages and manifolds of the cooling circuit 160. FIG. 2 illustrates a representative set of these channels, but it is to be understood that some of the channels are not visible from the vantage point of this perspective view or are not shown for simplification.

In the illustrated embodiment, the segment 124 includes a first side 210 defining a first channel 212 extending in the width direction and second and third channels 214 and 216 extending in the length direction. The first channel 212 is disposed under the end cap 150 and cooperates therewith to define the intake manifold 166. The second leg 122 includes a first side 220 defining a channel 222 extending along the length of the leg 122. The channel 222 at least partially defines the supply passage 180. A second, opposite side 224 of the leg 122 defines a channel 226 that at least partially defines the return passage 192. An outer side 228 of the leg 122 defines one or more recessed channels 230 that extend between the channel 222 and the channel 226. The channels 230 form the outer interconnecting passages 190. An inner side 232 of the leg 122 defines one or more channels 234 that extend between the channel 222 and the channel 226. The channels 234 form the inner interconnecting passages 188. The side 240 of the segment 126 includes channels (not visible) similar to the segment 212. These channels form the outlet manifold 172 and portions of the return passages. The first leg 120 defines channels similar or the same as the channels of the second leg 122 and will not be described for brevity.

While the legs are explained as defining channels as a unit, in actuality, each segment has a recessed channel that is aligned with and cooperates with the individual channels of the adjacent segment(s) to form the above-described channel. Similarly, each of the spacers 136 defines one or more notches 242 (two in the illustrated embodiment) that are sized and shaped to match the channels defined in the segments. The notches 242 of the spacers 136 are aligned with and cooperate with the recessed channels of the segments to define continuous open channels.

The illustrated embodiment of the cooling circuit is but one example. More or less channeling may be provided in the core depending upon the size of the inductor and the power requirements and heat generation. Therefore, the cooling circuit 160 simply provides a representative basis for forming internal cooling passages within an inductor between the core and the coils.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to, strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A power inductor comprising:
    a magnetic core defining at least one recessed channel, wherein the core includes a plurality of segments separated by spacers;
    first and second end caps disposed on opposing ends of the core, wherein the first end cap defines an inlet port and the second end cap defines an outlet port, and
    a coil wrapped around the core and cooperating with the recessed channel to define a cooling passage in fluid communication with the inlet and outlet ports, wherein at least one of the spacers defines a notch sized and shaped to match the recessed channel and aligned with the recessed channel to define a portion of the cooling passage.

2. The power inductor of claim 1, wherein the core further defines a second recessed channel that is orthogonal to, and in fluid communication with, the recessed channel.

3. The power inductor of claim 1, wherein the core defines a plurality of recessed channels interconnected to form a cooling circuit between the coil and the core.

4. The power inductor of claim 1 further comprising a check valve connected to the outlet port.

* * * * *